United States Patent [19]

Kubo

[11] Patent Number: 4,860,207

[45] Date of Patent: Aug. 22, 1989

[54] INFORMATION TRANSMISSION CONTROL APPARATUS FOR ELEVATOR SYSTEM

[75] Inventor: Susumu Kubo, Tokyo, Japan

[73] Assignee: Kabushiki Kaisha Toshiba, Kawasaki, Japan

[21] Appl. No.: 101,135

[22] Filed: Sep. 25, 1987

[30] Foreign Application Priority Data

Sep. 30, 1986 [JP] Japan ............................... 61-231767

[51] Int. Cl.[4] ........................... G06F 15/46; B66B 1/00

[52] U.S. Cl. ................................. 364/424.01; 187/124

[58] Field of Search ......... 364/424; 187/121, 124–140

[56] References Cited

U.S. PATENT DOCUMENTS 3,851,735 12/1974 Westinghouse ...................... 187/121
4,037,688 7/1977 Westinghouse ...................... 187/127
4,698,780 10/1987 Mandel et al. ...................... 187/130

FOREIGN PATENT DOCUMENTS 1593301 7/1981 United Kingdom .
2111244 6/1983 United Kingdom .
2149146 6/1985 United Kingdom .

*Primary Examiner*—David Mis

*Attorney, Agent, or Firm*—Oblon, Spivak, McClelland, Maier & Neustadt

[57] ABSTRACT

An elevator system including a group control function section which provides a control instruction for managing the operation of elevators in accordance with demands or conditions based on various kinds of information such as status information of a plurality of elevators and generated hall call information, unit control function sections, provided for respective elevator cages, for controlling the elevators based on the instruction from the group control function section, and a monitor control function section, capable of exchanging information with the control function sections, for monitoring the entire elevator system. The control function sections are connected through a network, and a plurality of logical communication paths are set in the network. Logical connection relationship using independent logical communication paths are established for respective inter-control processes, so that inter-control process communications are executed using packets at high speed. The communication packets are sent to the logically connected control processes, thus realizing control functions of the elevator system.

13 Claims, 13 Drawing Sheets

INFORMATION TRANSMISSION CONTROL APPARATUS FOR ELEVATOR SYSTEM

BACKGROUND OF THE INVENTION

The present invention relates to an information transmission control apparatus for an elevator system for executing high-intelligence communication control of inter-control process communication between controllers in an elevator system.

In a conventional group control elevator system, unit car controllers, a monitor controller, a common controller, and the like have a one-to-one correspondence, and various control data are exchanged in parallel and serial transmission modes.

Recently, the control functions have tended to be distributed in order to achieve multifunctions of a control CPU (or MPU) and to balance the control load of the CPU. However, in the conventional system, data communication means among controllers are asynchronously operated. In addition, cuing or queuing of data communication processes from tasks, i.e., cue management, is performed one at a time and is slow. Therefore, in inter-task communication among the controllers, if communication is started between given tasks, it occupies a transmission line until the communication ends. Thus, during this communication, even if the transmission line is in a ready state, it cannot be used. In the inter-task communication, data cannot be efficiently exchanged. Therefore, it is impossible to realize high-intelligence inter-controller communication such as a priority control function by a plurality of inter-task communications. For this reason, distributed control such as a distributed group control function, on-line communication with a monitor controller using a CRT, and the like, or a high-intelligence inter-task communication function cannot be realized. Moreover, since data communication cannot be desirably performed, the control functions of elevators are degraded.

SUMMARY OF THE INVENTION

It is therefore an object of the present invention to provide an information transmission control apparatus for an elevator system which can realize distributed control such as a distributed group control function, on-line communication with a monitor controller using a CRT, and the like, and a high-intelligence inter-task communication function to improve the control functions of elevators.

An elevator system of the present invention includes a group control function section for providing a control instruction for managing the operation of elevators in accordance with demands or conditions based on various kinds of information such as status information (e.g., the position information of elevator cages, the moving direction information thereof, the moving speed information thereof, the load weight information thereof, or the open/close/stop state information thereof) of a plurality of elevators and generated hall call information; a unit control function section, provided for each unit elevator car, for controlling the elevator based on the instruction from the group control function section; and a monitor control function section, capable of exchanging information with the control function sections, for monitoring the entire elevator system. The present invention has the following features in order to achieve the above object.

The control function sections are connected through a network, and a plurality of logical communication paths are set in the network. In order to realize communication among controllers in the control function sections, a logical connection relationship using an independent logical communication path is established for each inter-control process unit so that inter-control process communication can be executed using packets at high speed. The communication packet is sent to the logically connected control process, thus realizing control functions of the elevator system.

In the system of the present invention, the control function sections are connected through a network, and a plurality of logical communication paths (paths for ports P1–PN in FIG. 5; ports S, D in FIG. 6; ports 1–N in FIG. 7; or ports 1–N in FIG. 12) are set in the network. A logical connection relationship using an independent logical communication path is established for each inter-control process unit, and inter-control process communication can be executed using packets at high speed. (This high speed packet communication can be obtained by the high speed operation of MPU, DLC, and MAC shown in FIG. 4.) The communication packet is sent to the logically connected control process. (Incidentally, the inter-control process unit contains all communication processes performed via transmission line 60 in FIGS. 5–7.) In this manner, a plurality of cues or queues are provided by establishing the logical connection relationship using the independent logical communication path for each inter-control process unit (i.e., a plurality of transmission/reception cuing configurations are employed as shown in FIG. 7). The relationship between control processes is fixed (cf. the relationship between the mainfunction process and subfunction process shown in FIG. 12), and information supplied through the network is supplied between the control processes in the fixed relationship.

In addition, communication of the present invention can be performed using packets at high speed. Therefore, upon execution of given inter-control process communication, one inter-control process communication does not fully occupy a transmission line, and there is no need for other process communications to wait for the completion of previously executed inter-process communication. Thus, communication can be performed by commonly using a single transmission line without causing errors, and the respective control processes can be executed. Therefore, high-intelligence communication such as priority control by inter-process communication can be attained, and data communication can be efficiently executed between a plurality of processes. In this manner, the distributed group control function also becomes available, and hence, the control functions of the elevator system can be improved.

DETAILED DESCRIPTION OF THE PREFERRED EMBODIMENTS

An embodiment of the present invention will now be described with reference to the accompanying drawings.

Figure 1:
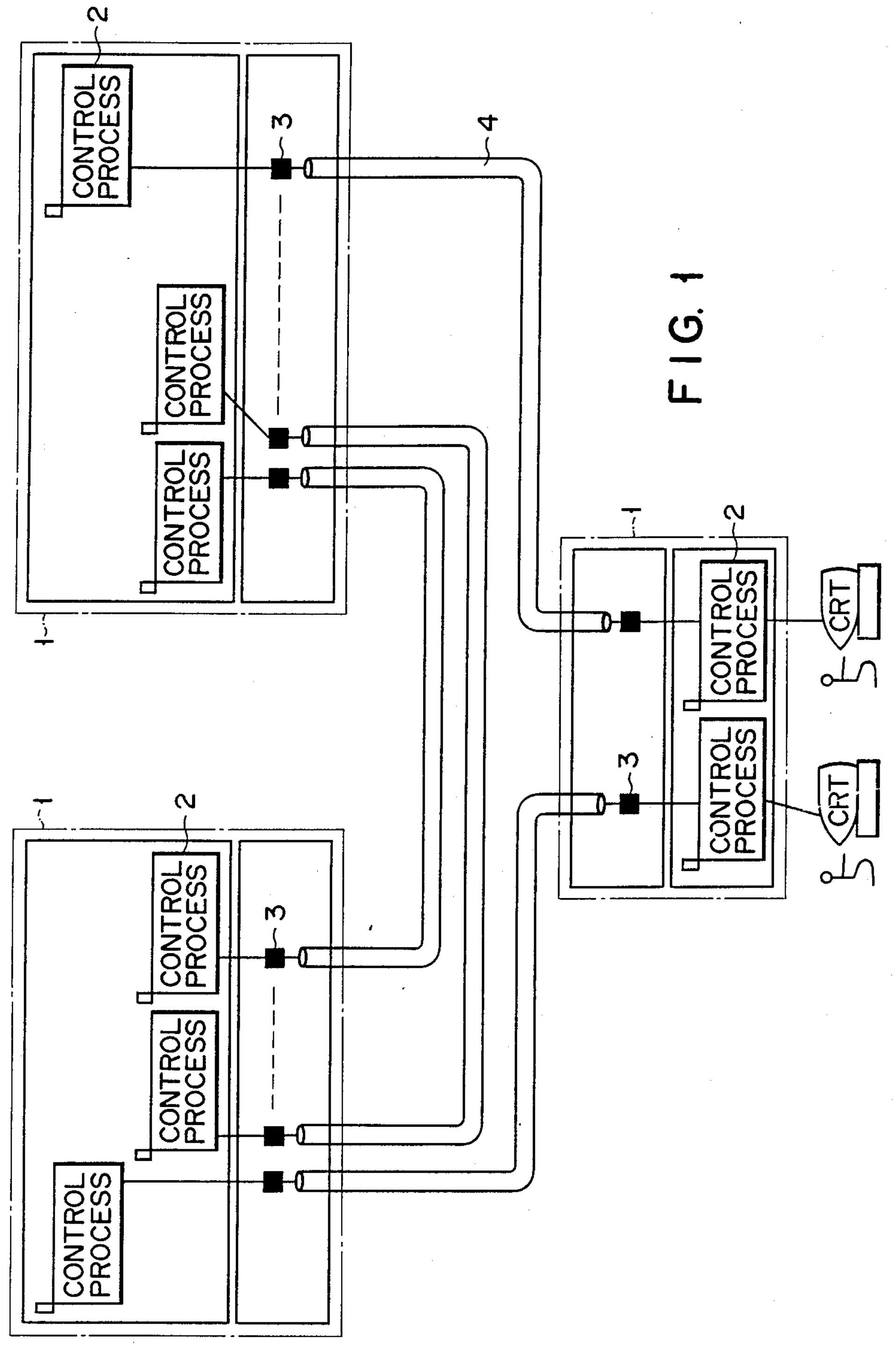
FIG. 1 is a diagram showing an arrangement of a transmission control system according to the present invention.

FIG. 1 shows a model of a transmission control system arrangement for elevators. In FIG. 1, the model of logical connections between control processes through logical communication paths between controllers is illustrated.

In FIG. 1, reference numeral 1 denotes stations, or controllers, for performing information communication. Each station 1 includes a plurality of control processes 2. Each control process 2 is connected to processes in other stations 1 through logical paths 4, and executes inter-process communication. In order to execute the inter-process communication, a logical link is formed between given process 2 and another station 1 for each process unit, through socket 3 and via logical communication path 4 corresponding to socket 3, thus establishing the logical communication relationship.

Logically, sockets 3 are statically fixed with respect to control processes 2 to have one-to-one correspondence therebetween. In order to execute transmission/reception between the stations, interprocess communication is executed using the logical communication path forming the logical link through fixed socket 3. A set of a plurality of logical links (logical communication paths 4) are constituted by a single physical transmission line on a physical level. A multiplexed physical transmission line can be realized using the plurality of logical communication paths 4 by the transmission control function on a higher hierarchical level than the physical level. I/O management of multiplexed logical communication paths 4 is executed for each path. Each control process 1 can access the transmission control function only through socket 3 serving as an I/O port.

More specifically, each station 1 corresponds to a controller. For example, the upper two stations in FIG. 1 correspond to a group controller and an elevator car unit controller, and the lower station corresponds to a monitor controller. Processes 2 in each controller correspond to control functions executed by the corresponding controller. For example, in the monitor controller, processes 2 correspond to, e.g., a screen display process program to a CRT display, a message generation process program which is key-input by an operator, and the like. Each control process is synchronized with a control task between controllers through logical link 4 based on the relationship of local state/remote state, and distributed processing can be executed by inter-control process communication.

The basic principle of the present invention is as mentioned above.

An embodiment of the present invention utilizing the principle described above will be described hereinafter in detail.

As an embodiment, inter-control process communication operations of a group control function, and inter-control process communication operations of a monitor control function in a group control elevator system, will be described.

Figure 2:
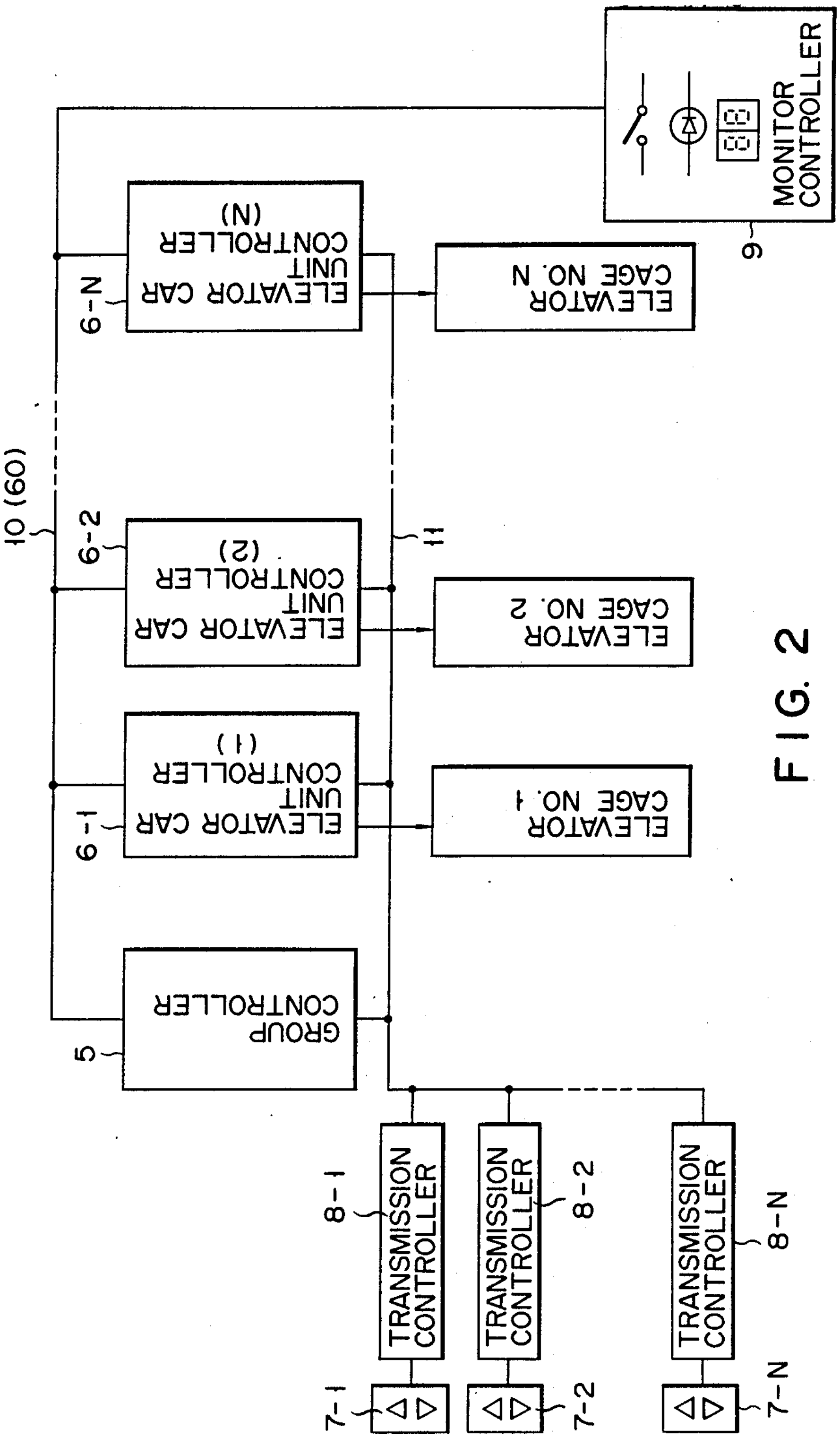
FIG. 2 is a block diagram showing an elevator system embodying the present invention.

FIG. 2 is a block diagram showing an arrangement of a group control system to which the present invention is applied.

As shown in FIG. 2, group controller 5 is physically connected to elevator car unit controllers 6-1 to 6-N for controlling elevator units, via high-speed transmission system 10 and low-speed transmission system 11 both for transmitting information. Group controller 5 and unit controllers 6-1 to 6-N comprise small computers, such as microcomputers, and are operated under the control of software. (Detailed descriptions for this operation will be given later, with reference to FIG. 4).

Single high-speed transmission system 10 is a transmission control system for performing transmission between unit controllers 6-1 to 6-N and group controller 5, or between a control computer in a machine room and monitor controller 9, and is constituted by a high-speed high-intelligence network (e.g., the Ethernet LAN system proposed by Xerox Co., U.S.A.).

Control information necessary for managing the group control is exchanged at high speed between group controller 5 and unit controllers 6-1 to 6-N, via logical transmission paths which are multiplexed in a single physical transmission line 10. Low-speed transmission system 11 is a transmission control system for transmitting information, sent mainly through up/down paths of elevators, such as information from hall call units 7-1 to 7-N provided at respective floors. System 11 has a lower transmission speed than that of high-speed transmission system 10. System 11 uses an optical cable because it is normally long, and exchanges data with group controller 5 and unit controllers 6-1 to 6-N. Transmission controllers 8-1 to 8-N are inserted between hall call units 7-1 to 7-N and low-speed transmission system 11.

When controller 5 is in a normal state, a hall call from hall call unit 7 is transmitted to controller 5 through transmission system 11, and the corresponding control operation is performed. When the hall call is registered, a registration lamp is turned on, and an optimal elevator car is determined based on information sent from unit controllers 6-1 to 6-N through transmission system 10. Then, controller 5 supplies a control instruction to the determined elevator unit. The unit controller receiving the control instruction performs unit control using the control instruction as hall call information.

Note that reference numeral 9 denotes a monitor controller which is connected to unit controllers 6-1 to 6-N and group controller 5 through high-speed transmission system 10. Controller 9 displays information obtained from these controllers, and can perform setting of an operation cage, manual setting of an operation mode, an ON/OFF operation of a power source, an instruction, and the like.

Incidentally, group controller 5 and unit controllers 6-1 to 6-N can be embodied by the system processor and the master car controller, respectively, disclosed in U.S. Pat. No. 3,851,735 (Winkler et al.) issued on Dec. 3, 1974. All disclosures of this U.S. Patent are now incorporated in the present patent application.

Figure 3:
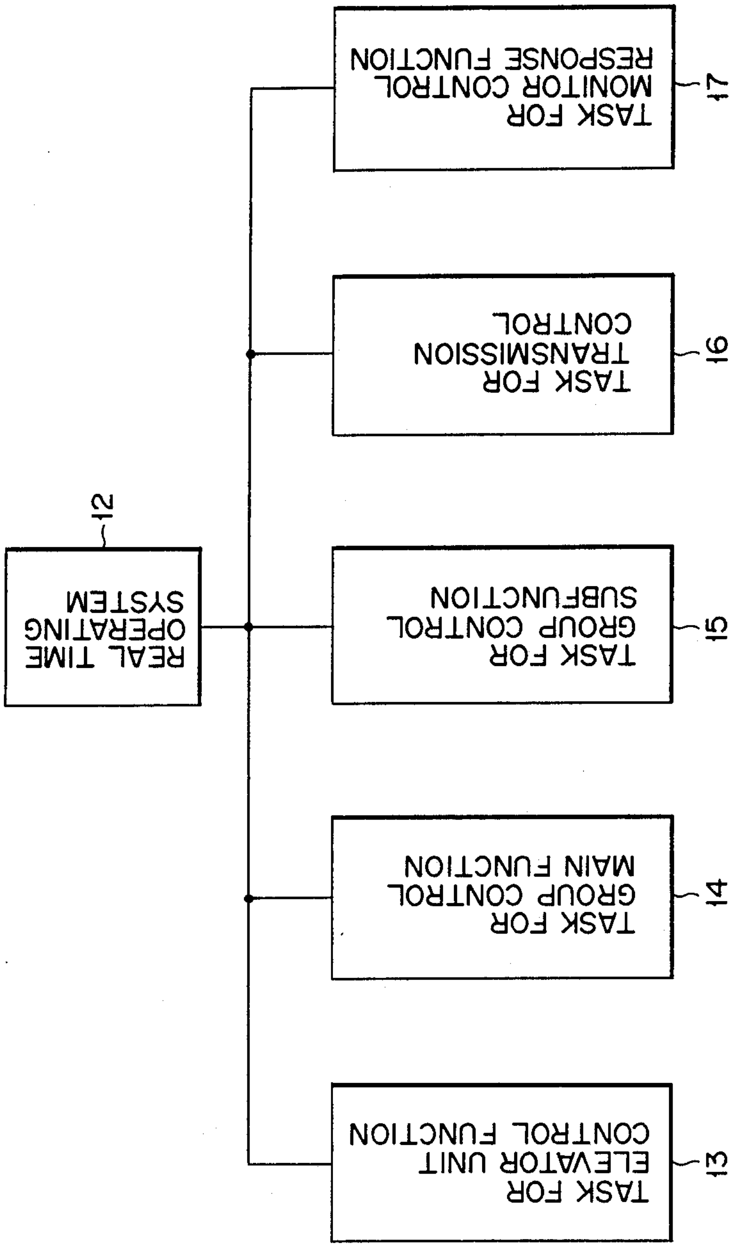
FIG. 3 is a block diagram showing a software arrangement of an elevator unit controller in a transmission control for the elevator system according to the present invention.

Further, each of transmission controllers 8-1 to 8-N can be embodied by the circuit disclosed in FIG. 3 of the copending U.S. patent application Ser. No. 875,876 now U.S. Pat. No. 4,709,788, (Harada) assigned to Toshiba Co., Japan. The disclosure of this U.S. patent application is incorporated in the present patent application.

Other U.S. Patents relating to an elevator system are:

(1) U.S. Pat. No. 4,037,688 (Winkler) issued on Jul. 26, 1977;

(2) U.S. Pat. No. 4,081,059 (Kuzunuki et al.) issued on Mar. 28, 1978;

(3) U.S. Pat. No. 4,355,705 (Schröder et al.) issued on Oct. 26, 1982.

All disclosures of the above U.S. Patents are also incorporated in the present patent application.

FIG. 3 shows an embodiment of a software arrangement of the unit controller according to the present invention. The software includes real time operating system (real time OS) 12, task 13 for an elevator unit control function, task 14 for a group control main function, task 15 for a group control sub function, task 16 for transmission control, and task 17 for a monitor control response function. Each task is managed by real time OS 12, and start and end of each task are controlled by a scheduler in OS 12. For instance, iRMX 86 operating system of Intel Co., U.S.A., can be used for OS 12.

Task 13 is a task for operating the elevator units as a core function of the unit controller, and has a higher task priority order. Task 13 performs elevator cage call control; cage assignment control in response to hall calls; open/close control of cage doors; and running, speed-down and/or stop instruction control of cages.

Task 14 controls a main function of the group controller. Task 14 acquires information for each elevator car from task 15 distributed to each elevator unit, and performs logical calculation of the acquired information to select an optimal elevator car. Task 14 then supplies a control instruction to the selected elevator car, thereby responding to the hall call.

Task 15 controls a function for processing information in units of elevator cars of group controller 5 under the control of task 14. More specifically, unit controllers 6-1 to 6-N are connected to task 14 through logical links, by computers having the group control main function, and these controllers execute intercontrol process communication. A server/receiver station port No. is designated for each elevator station by a main function station as a master station. Distributed processing is executed in units of elevator cars in accordance with a transmission request instruction through each server station port No., and data is sent back to the main function station upon completion of the processing.

Task 16 manages data exchange along transmission system 10 and logical links between the control processes, and executes control of transmission/reception cue for each socket with respect to a plurality of multiplexed logical communication paths. Details of task 16 will be described later with reference to FIGS. 5–11.

Task 17 has a function for controlling data communication with monitor controller 9, and executes display data transmission to a display section as well as response message transmission by a key input from monitor controller 9, via the logical link connected to the monitor control function task in monitor controller 9, to thereby execute inter-process communication therewith.

Figure 4:
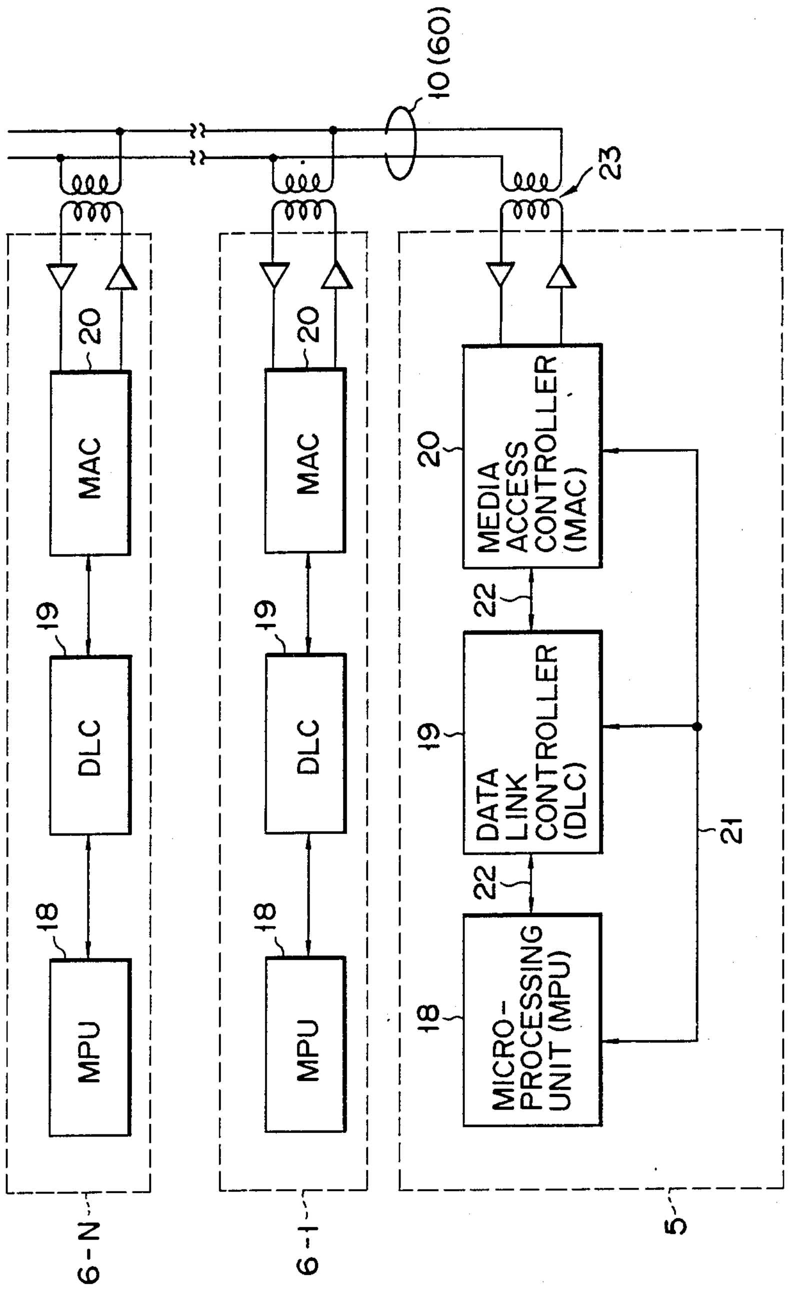
FIG. 4 is a block diagram showing a hardware arrangement of a high-speed transmission system according to the present invention.

FIG. 4 is a block diagram showing an embodiment of a system arrangement of high-speed transmission system 10 shown in FIG. 2. Transmission control can be realized by using high-intelligence data link controller 19 and media access controller 20 for controlling, e.g., a data link hierarchy of a LAN (local area network) model proposed by the ISO (International Standardization Organization). More specifically, a rate of transmission control software, such as buffering management of transmission packets managed by microprocessor (MPU) 18, is reduced. For instance, i82586 (Local Area Network Coprocessor) of Intel Co., U.S.A., can be used for buffering management MPU 18, and the transmission control software can be a conventional one as is provided for Intel i82586.

As a controller for realizing high-intelligence transmission control, for example, data link controller 19 can be formed of i82586 available from Intel Co., U.S.A., and media access controller 20 can be formed of i82501 available from Intel Co. These controllers can easily realize a high-speed transmission function of 10 Mbit/-sec, while reducing a rate of working of MPU 18. MPU 18 and data link controller 19, and controllers 19 and 20, are connected through control lines 22. MPU 18, and controllers 19 and 20 are connected through system bus 21. External serial transmission device 23 is accessed through media access controller 20.

Figure 5:
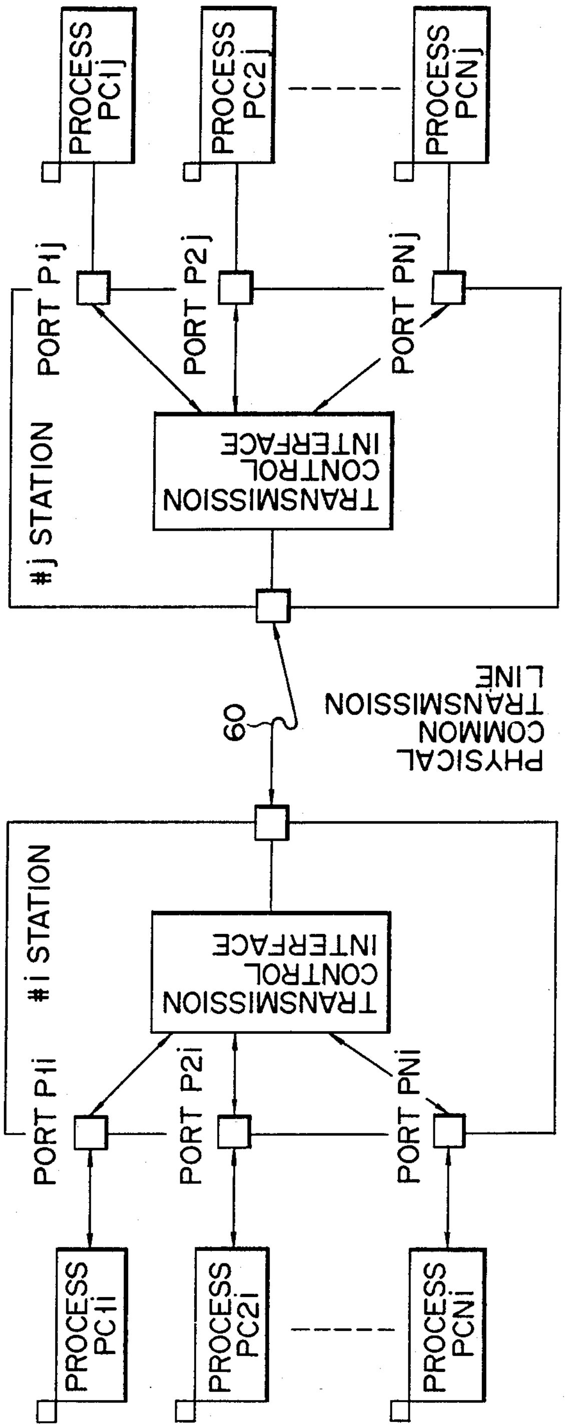
FIG. 5 is a block diagram showing a system arrangement of a logical transmission path of the transmission system according to the present invention.
Figure 6:
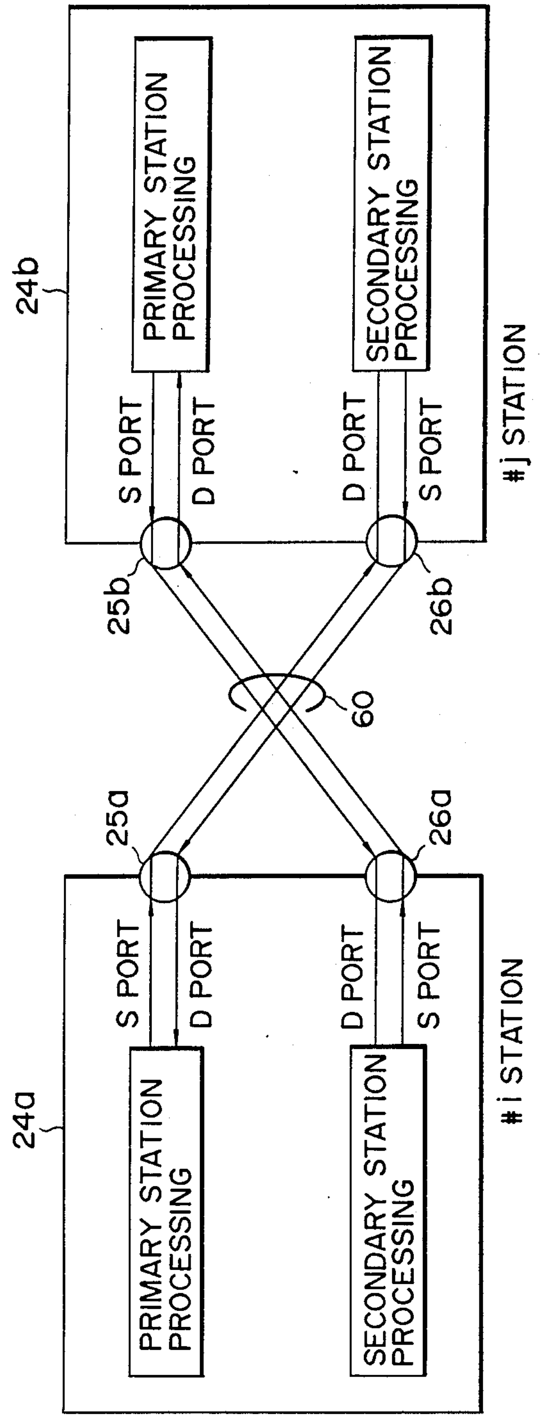
FIG. 6 is a diagram showing connections of the logical transmission paths according to the present invention.

FIG. 5 is a block diagram showing a system arrangement of an inter-process logical communication path in the logical system arrangement model of high-speed transmission system 10 shown in FIG. 2. FIG. 6 is a diagram showing logical connections of inter-port transmission shown in FIG. 5.

Figure 7:
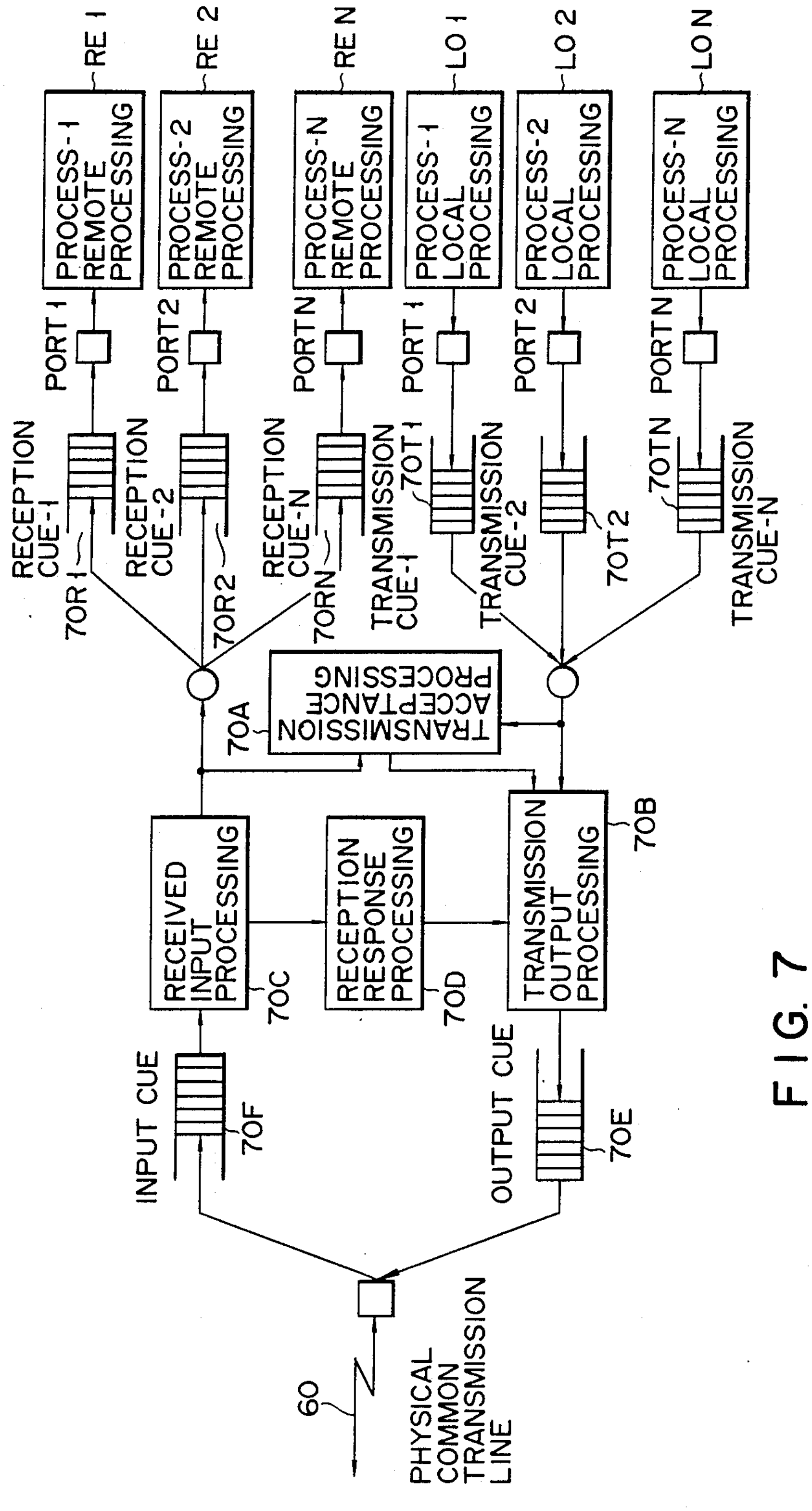
FIG. 7 is a block diagram showing a control operation of the transmission control system according to the present invention.
Figure 8:
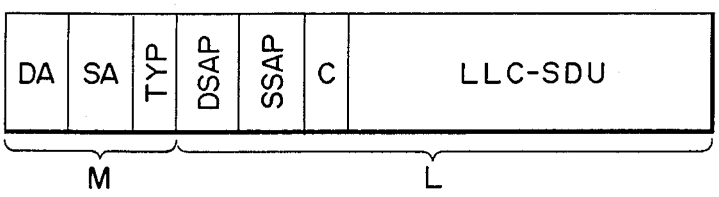
FIG. 8 is a block diagram showing a transmission frame format of a data link hierarchical level according to the present invention.

FIG. 7 is a diagram showing inter-process control operations of the transmission control system shown in FIG. 6. FIG. 8 is a block diagram showing an example of a frame format on the common physical transmission line. FIGS. 9, 9A and 10, 10A are flow charts showing a detailed embodiment of primary and secondary station function operations in the inter-process communication of user management tasks. FIG. 11 shows an embodiment of a management table managed by the transmission control software. The management table is divided in units of port Nos. of logical communication paths, and can realize protocol management in units of port Nos.

The management table shown in FIG. 11 is stored in a RAM (not shown) connected to MPU 18 of FIG. 4. With respect to the transmission and reception control of each of ports No. 1 to No. N in FIG. 7, the contents of the above RAM are:

(A) For Transmission Control (1) Mail Box indicating Destination Address for Port Processing;

(2) Management Table Pointer showing newly-accepted Transmission Cue in Transmission Request Waiting Queues (Transmission Cues 1 to N in FIG. 7);

(3) Management Table Pointer showing Transmission Cue currently-processed by DLC 19 in FIG. 4;

(B) For Reception Control (4) Mail Box indicating Return Address for Port Processing;

(5) Management Table Pointer showing newly-accepted Reception Cue in Reception Request Waiting Queues (Reception Cues 1 to N in FIG. 7);

(6) Management Table Pointer showing Reception Cue currently-processed by DLC 19 in FIG. 4.

Figure 12:
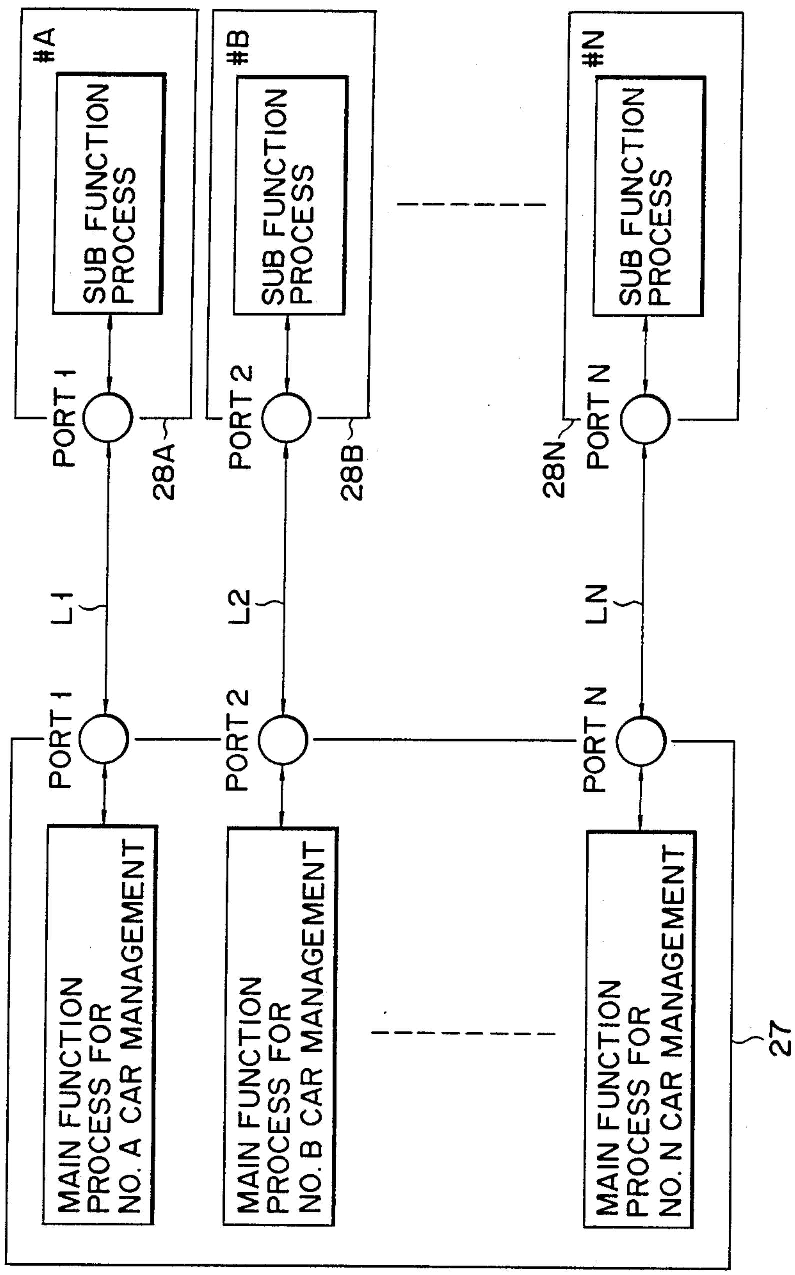
FIG. 12 is a block diagram showing an inter-process communication function using logical links of controllers according to the present invention.

FIG. 12 is a block diagram showing an example of a logical link state in the processes of controllers in the elevator system shown in FIG. 2.

The operation of the apparatus with the above arrangement will now be described. Controllers 5, 6-1 to 6-N, and 9, shown in FIG. 2, constituting the elevator system, serve as information transmission stations, and are connected through single high-speed transmission system 10. The stations (controllers) perform information transmission through transmission system 10, using control processes in the respective stations, so that necessary information is exchanged.

More specifically, as shown in the block diagram in FIG. 5, N logical transmission paths are set on common physical transmission line 60 corresponding to high-speed transmission system 10. These logical transmission paths correspond to logical transmission paths L1-LN shown in FIG. 12. Processes PC1i to PCNi and PC1j to PCNj in stations #i and #j perform communication with other processes, through ports Pli to PNi and P1j to PNj set for the respective logical transmission paths. Note that the above ports correspond to sockets 3 in FIG. 1. Therefore, the stations (#i, #j) can execute parallel processing of processes corresponding in number to the ports, i.e., N processes, and transmission/reception cuing operations of the processes are independently managed by transmission control task 16 in accordance with the transmission control management table shown in FIG. 11. This management can be done by the aforementioned local area network co-processor i82586 of Intel Co.

FIG. 7 shows the transmission/reception operation from each process. The protocol processing of this transmission/reception operation is shown in FIGS. 9A and 10A. Transmission queues or cues (70T1–70TN) of transmission requests, sent through the corresponding ports from local processing functions (LO1–LON) as the primary station function of the processes, are formed in accordance with the transmission control management table in FIG. 11 for each port No. 1-N (steps 9A-1, 9A-2 in FIG. 9A). In remote processing functions (RE1–REN) as the secondary station function, reception cues (70R1–70RN) of reception requests are similarly controlled and formed in accordance with the transmission control management table in FIG. 11 (steps 10A-3 to 10A-5 in FIG. 10A). A transmission output (steps 9A-3 to 9A-5 in FIG. 9A) to physical transmission line 60 or a reception input (step 10A-1, 10A-2 in FIG. 10A) from physical transmission line 60 is temporarily buffered as a transmission packet in the form of an output cue (70E) or input cue (70F). This buffering is managed by controllers 19, 20 in FIG. 4, and transmission/reception control with respect to common physical transmission line 10 (or 60) is performed at high speed without being through MPU 18.

Note here that the transmission control interface shown in FIG. 5 can be constituted by the combination of the input cue, output cue, reception cues (1-N), transmission cues (1-N), received input processing, reception response processing, transmission output processing, and transmission acceptance processing, shown in FIG. 7.

FIG. 8 shows the frame format of the data link hierarchy of packets which are sent onto physical transmission line 60 according to the input/output cuing state so as to perform information transmission. As shown in FIG. 8, the data link hierarchy is constituted by two sub hierarchies, i.e., media access sub hierarchy M and logical link control sub hierarchy L. DA, SA, and TYP are protocol control information for the media access control sub hierarchy, and are respectively receiver station address information, server station address information, and a higher hierarchy protocol identification type field. Control processing of the media access control sub hierarchy protocol information mainly corresponds to transmission/reception control of packets sent between stations. In the LAN, this control processing is executed by data link controller 19 and media access controller 20 without going through MPU 18. DSAP, SSAP, C, and LLC-SDU are protocol control information and protocol service data units of the logical link control sub hierarchy, which are managed by MPU 18, and mainly execute a transmission path management function of the logical structure. The above units control the generation and management of the multiplexed logical communication paths, and realize inter-process logical link control.

Of these elements, DSAP is a receiver socket No., SSAP is a server socket No., C is a logical link control field, and LLC-SDU is a logical link control service data unit. I/O management in units of socket designations of the plurality of logical communication paths is mainly executed by receiver/server socket No. DSAP/SSAP, and the detailed communication function of the inter-process communication is realized by logical link control service data unit LLC-SDU.

An inter-processor communication will be described with reference to FIGS. 5, 6, 9, 9A, 10 and 10A. Assume that transmission from station #i to station #j is performed. In the primary station function process as a process for requesting transmission (cf. FIG. 6), sockets for sending the transmission request to transmission control task 16 are designated. This designation is performed by designating an S port as the output in the server station, and a D port as an input of the receiver station (step 9*a* in FIG. 9).

Figure 9:
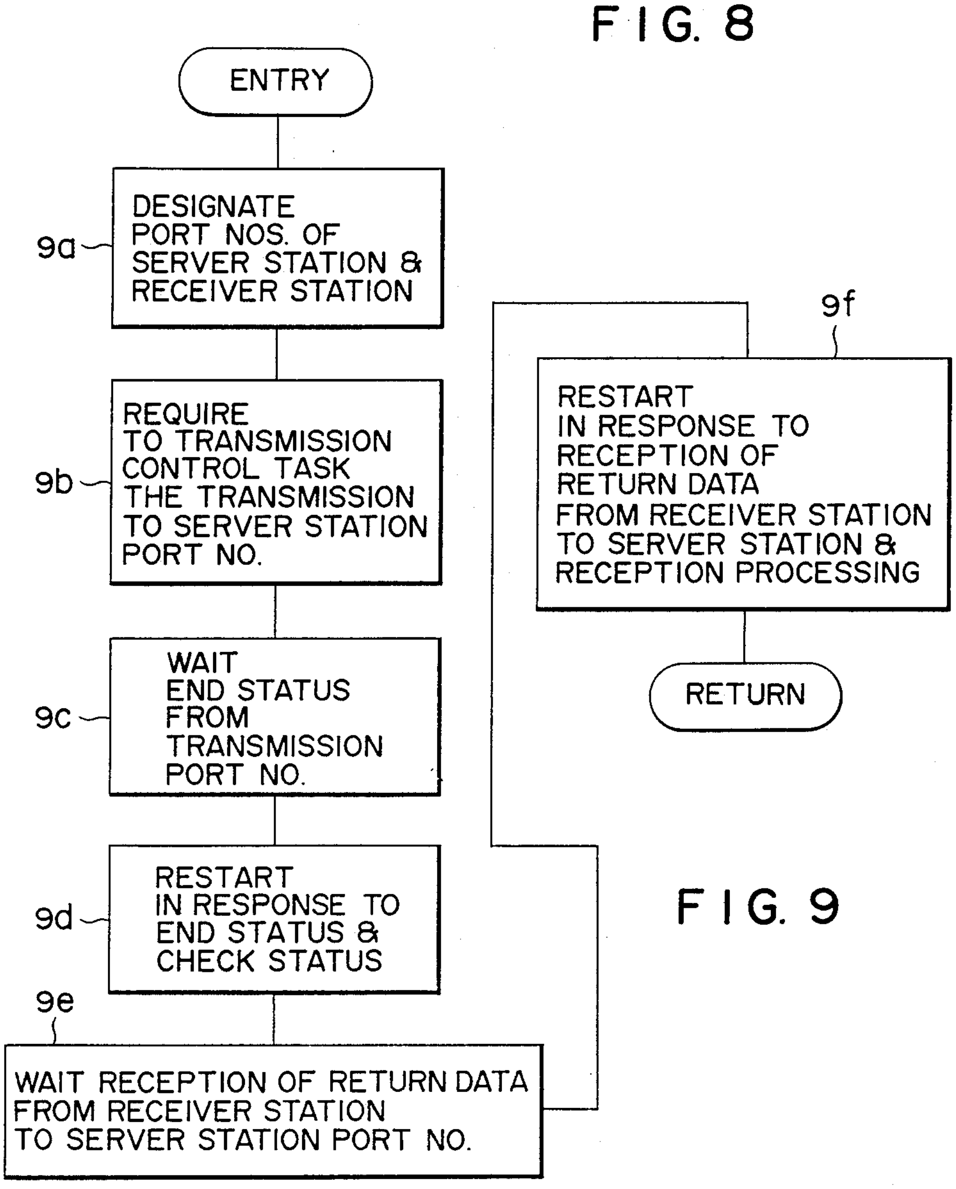
FIGS. 9, 9A and 10, 10A are flow charts showing detailed primary and secondary station processing operations in inter-task communication according to the present invention.
Figure 9A:
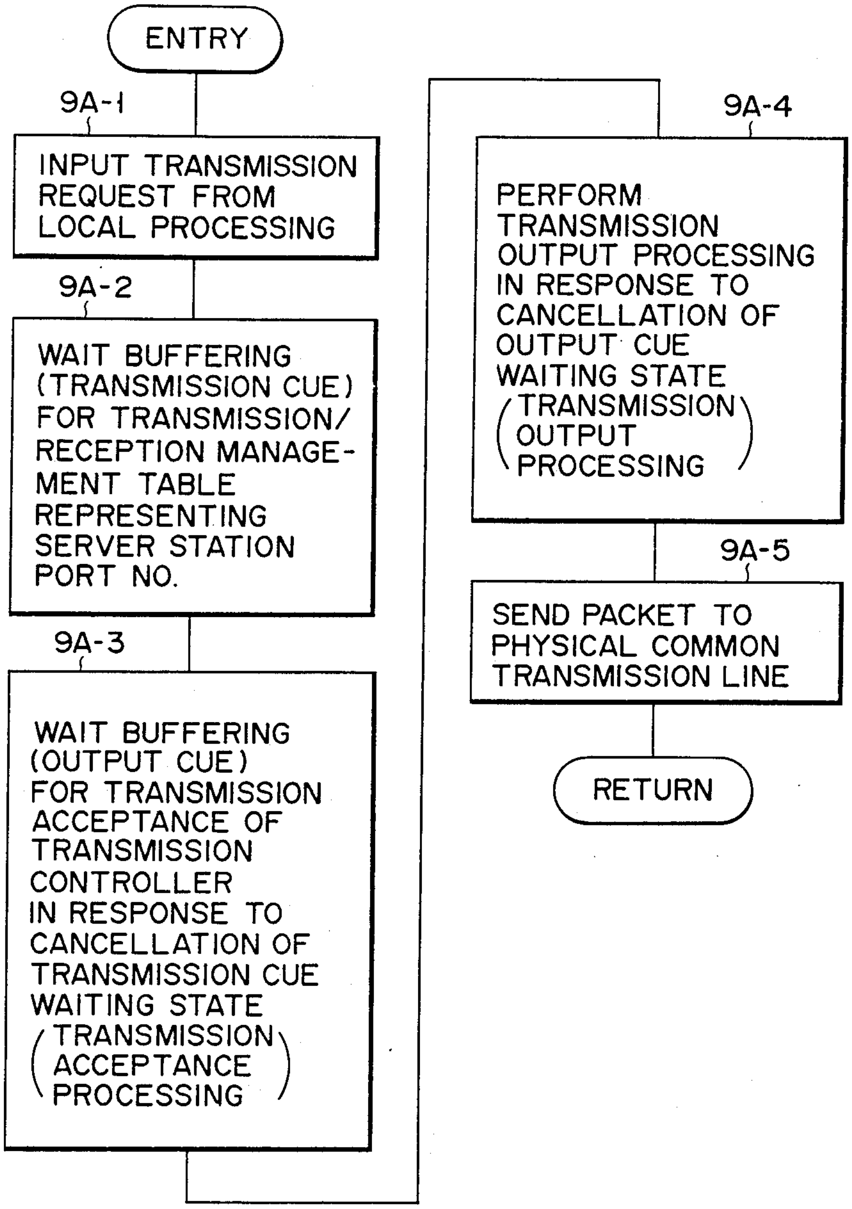

The operation shown in FIG. 9 corresponds to the primary station processing of #i station 24*a* in FIG. 6. The server station port No. corresponds to No. set for transmission port 25*a*. The receiver station port No. corresponds to No. set for reception port 26*b*. After the output port (i.e., server station port No. S) and the input port (i.e., receiver station port No. D) are designated as described above, the transmission request to server station transmission port 25*a* is sent to transmission control task 16 (step 9*b*).

When the transmission request is sent, the transmission protocol processing of the primary station side is entered (step 9A-1 in FIG. 9A). In transmission control task 16, the generated transmission request is managed under the control of the corresponding transmission control management table of the server station port No. on the table shown in FIG. 11, and is cued in the transmission cue (70T1–70TN) of the server station port No. in FIG. 7 (step 9A-2). Then, a transmission packet is formed from the transmission cue, through transmission acceptance processing 70A (step 9A-3) and transmission output processing 70B (step 9A-4), and the packet is cued or queued in the output cue. The cued packet is managed under the control of the transmission controller 8. Thus, the primary station processing process awaits an end status from transmission control task 16 (step 9c). This process is temporarily interrupted, and control is returned to the scheduler of OS 12. In this case, if another process requesting transmission is present, the occupation of MPU 18 is shifted thereto.

The transmission packet is sent onto common physical transmission line 60 (or 10) by transmission controller 8 (step 9A-5 in FIG. 9A). This packet includes server station port No. S and receiver station port No. D as data SSAP and DSAP in the frame shown in FIG. 8. The receiver station checks these data to execute the transmission on the physical level. When the end status is set by transmission control task 16, the process of interest is restarted, and after completing status check (step 9d), the process awaits return data from the receiver station (step 9e). When the transmission packet is sent onto physical transmission line 60, the reception operation is performed in the receiver station (step 9f).

Figure 10:
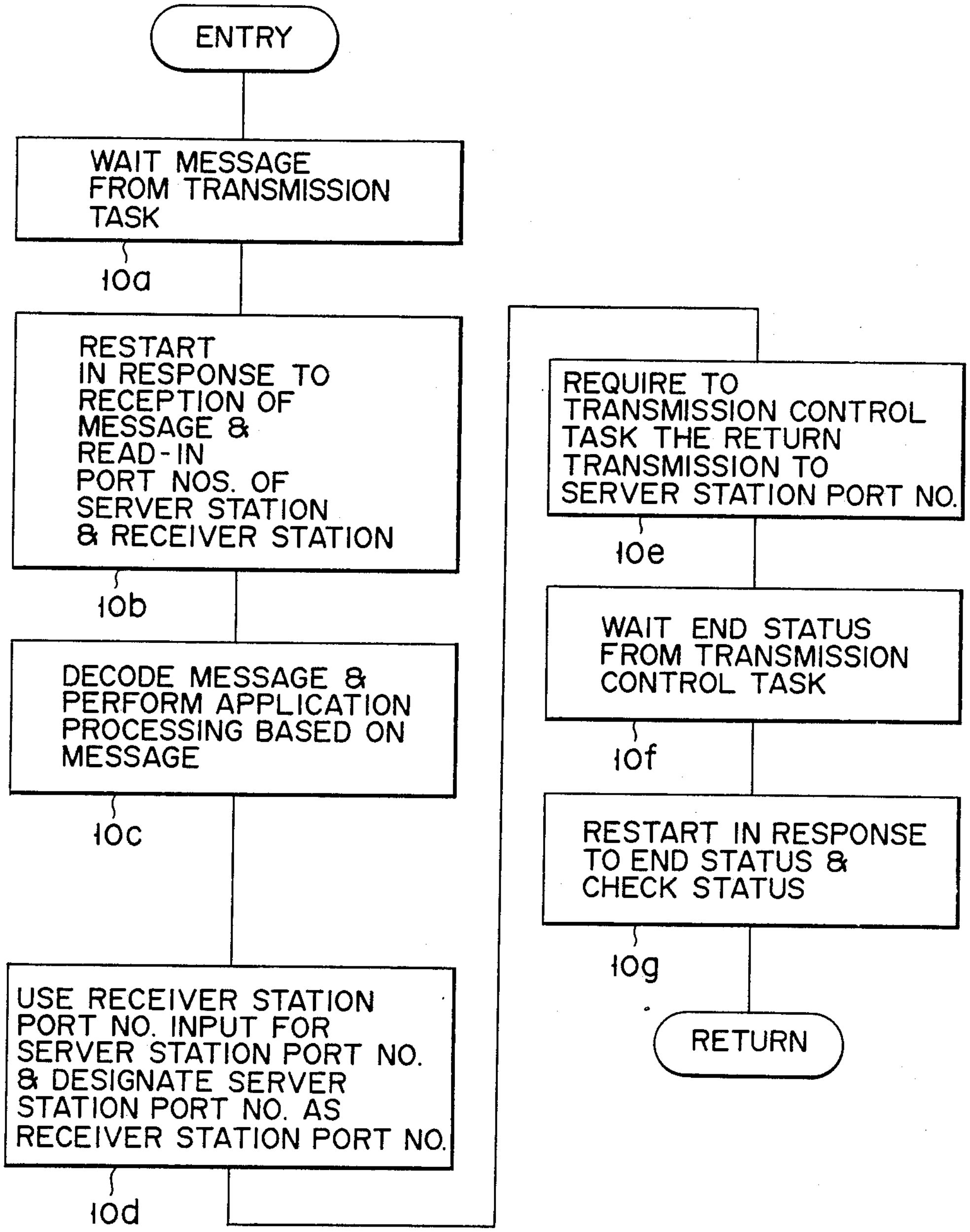
Figure 10A:
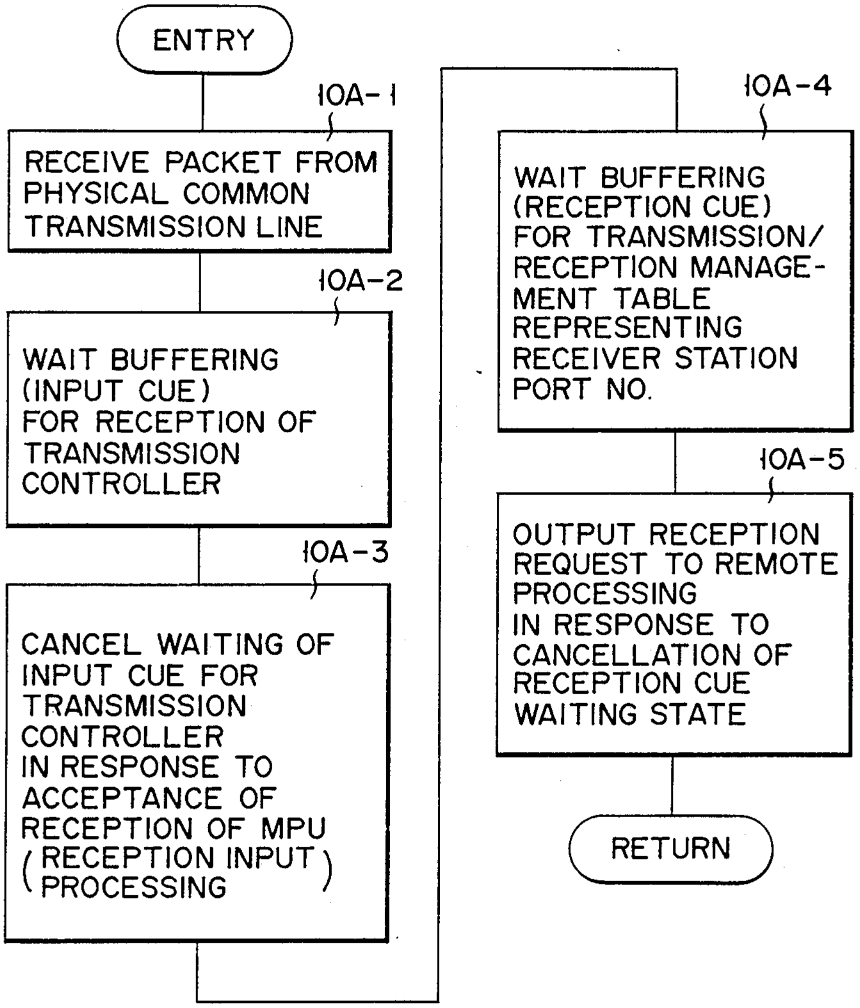
Figure 11:
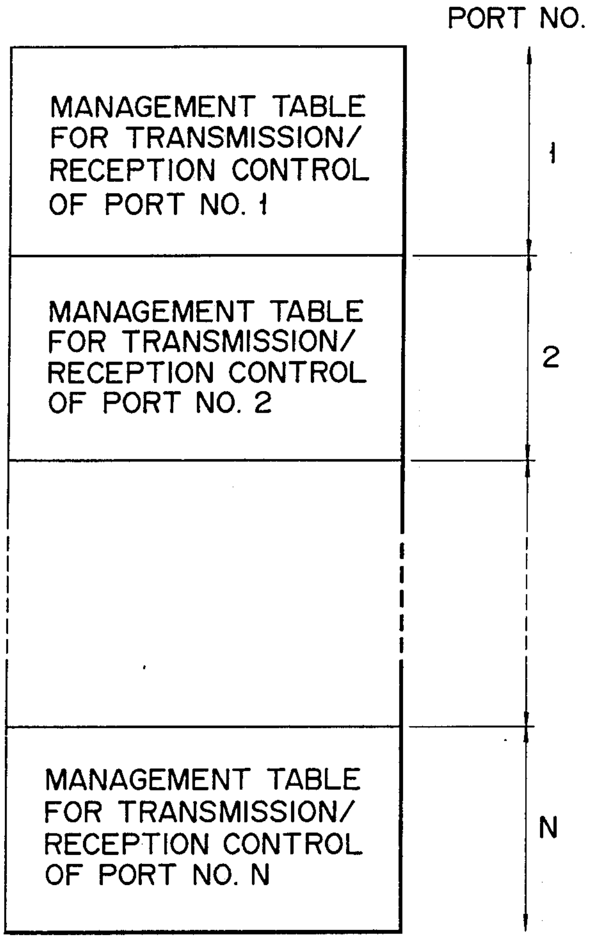
FIG. 11 is a view for explaining a management table managed by transmission control software according to the present invention.

FIG. 10 shows the secondary station processing corresponding to the primary station processing shown in FIG. 9, and corresponds to the secondary station processing of #j station 24b shown in FIG. 6. The transmission protocol processing of the secondary station side is shown in FIG. 10A. The logical transmission path is connected at reception port 26b corresponding to the D port designated by the receiver station No. The transmission packet is received through common physical transmission line 60 (step 10A-1), and is cued or queued in input cue 70F (step 10a, 10A-2), as shown in FIG. 7. The server/receiver station port Nos. are read (step 10A-4) through reception input processing 70C (step 10A-3) by transmission control task 16. Then, the transmission packet is cued (step 10A-5) in a reception cue (70R1–70RN) which relates to the D port having the designated port No., and is connected to the secondary station processing (step 10b). In the secondary station processing, message data of the inter-process communication is decoded based on unit information of the logical link control service data, and application processing (reception response processing 70D) is executed through the corresponding inter-process logical link (step 10c). Thereafter, the D port as the receiver station port No. upon data input is designated as the server station port No., and the server station port No. is designated as the receiver station port No. (step 10d) so as to request to transmission control task 16 the return transmission to the server station port No. (step 10e). This transmission flow corresponds to the return transmission from reception port 26b to transmission port 25a shown in FIG. 6, and represents that the return transmission is performed from the port No., received by the secondary station, to the port No., sent from the primary station.

When the end status of the return transmission is sent back from transmission control task 16, the process is restarted and data check is performed (steps 10f and 10g), thus completing the secondary station processing.

In the primary station processing, the return transmission packet is output from the output cue of secondary station 24b in the secondary station processing, and is received by primary station 24a to be used or queued in the input cue. Since transmission port 25a of primary station 24a is designated as the receiver station port No. upon return transmission in the secondary station, the transmission packet is input to the port corresponding to transmission port 25a. Since port 25a coincides with the server station port of the primary station process in the waiting state, the primary station process in the reception waiting state of the return data from the receiver station at server station port 25a is restarted. Then, the reception data is input, and reception data processing is performed, thus completing the primary station operation.

As described above, the controllers are connected through the logical transmission path such that the primary and secondary processing operations of the controllers are related by designating sockets forming the logical transmission path, i.e., designating the server/receiver station port Nos., and the logical link is formed by the sockets, thus realizing inter-process communication control. When a plurality of socket sets are uniquely designated for each process pair, a plurality of data links inherent to processes between the controllers can be logically connected. Each process can execute inter-process communication in an on-line manner independently of other processes, and a plurality of parallel processing operations can be executed.

According to the configuration of FIG. 7, when N inter-port connections are performed in a time-sharing manner in response to the generation timing of the transmission/reception cue, N processes are apparently executed because the operation speed of the hardware of FIG. 4 is sufficiently high, and N inter-process communications can be parallel executed even if the physical number of transmission line 60 is only 1. Therefore, efficiency of the normally high-speed common physical transmission line 60, as well as efficiency of the transmission controllers 19, 20, can be improved.

Therefore, distributed control function processing between the group controller and the unit controllers in the group control system, and high-intelligence transmission control such as on-line execution processing from the monitor controller having a CRT and an intelligent terminal function, can be realized, such that the logical links are set in advance among the processes of the stations through logical transmission paths. In other words, parallel operations of the processes (RE1–REN, LO1–LON in FIG. 7) can be realized under the real time management of OS 12.

FIG. 12 shows an embodiment of an inter-process communication function by the logical links in the elevator system. This inter-process communication can be performed by tasks 13 and 14 in FIG. 3. Station 27 has a primary station function, i.e., a mode function of managing a master main function process. The function of group controller 5, monitor controller 9, and the like, correspond to the function of this station. Stations 28A, 28B, . . . , 28N each have a secondary station function, i.e., a mode function of managing a sub function process, and they perform response control in accordance with an instruction from main function station 27.

In station 27, the main function process is executed, so that the management for each station for the sub function process is performed. Station 27 determines independent sockets in correspondence with respective sub function stations, establishes fixed logical links between the processes through ports PORT1 to PORTN, and executes inter-process communications. Station 27 manages all the inter-process communication contents with the sub function stations so as to determine execution of a control operation for the control functions.

As described above, in the system of the present invention, control function sections in controllers of the elevator system are connected through the LAN, and a plurality of logical links are set in the LAN. Independent logical links are provided to respective control process units so as to allow a plurality of transmission/-reception cuing management operations, and inter-control process communication is executed at high speed, using packets. For this reason, a waste time, such as a nonuse ready time for a packet communication during another packet communication in single transmission/-reception cuing (or queuing) management, can be saved, and hence, the transmission efficiency of the LAN physical transmission line can be improved. Therefore, distributed processing of control functions in the elevator system can be achieved even if only a single network (data transmission line) is used. In addition, since parallel operations of control processes can be executed, processing efficiency of control computers can be improved, and performance and reliability of the entire elevator system can be improved.

The inter-process communications are realized by independent logical links in units of control processes, so that communication can be performed utilizing a frequent nonuse period of the transmission line without being influenced by the communication period of other processes. Therefore, control function management for each process can be realized, and functions can be easily newly added and/or modified. In a system to which a monitor controller with a CRT is added, an on-line operation can be executed in real time, and a high-intelligence elevator system can be realized.

According to the present invention as described above, high-intelligence communications such as priority control by communications among a plurality of tasks can be performed, and data exchange can be efficiently executed among the plurality of tasks. Therefore, a distributed group control function can be realized, thus improving control functions of the elevator system. In this manner, the transmission control system of the elevator system having the above features can be provided.

Incidentally, the embodiments described with reference to FIGS. 3–12 can be used for embodying each of controllers 5, 6, and 9, shown in FIG. 2.

What is claimed is:

1. An information transmission control apparatus for an elevator system which comprises:

group control means for generating control instructions being used for controlling total operation of elevator cages of the elevator system in accordance with information of current operation modes of the elevator cages and hall calls therefor;

elevator car unit control means, coupled to said group control means, for controlling operation of each said elevator cage in accordance with the control instructions from said group control means; and data transmission means for physically connecting said elevator car unit control means with said group control means, and serially transmitting said control instructions between said elevator car unit control means and said group control means, wherein said group control means is provided with a plurality of predetermined processes indicated by said control instructions, and said group control means includes:

first transmitter means for selecting one-by-one said predetermined processes in accordance with given first transmission cues or queues, and serially outputting the selected predetermined processes as said control instructions to said data transmission means; and first receiver means for receiving said control instructions serially transmitted via said data transmission means, and selecting one-by-one the received control instructions as said predetermined processes in accordance with given first reception cues.

2. An information transmission control apparatus according to claim 1, wherein said elevator car unit control means is provided with a plurality of said predetermined processes, and said elevator car unit control means includes:

second receiver means for receiving said control instructions serially transmitted via said data transmission means, and selecting one-by-one the received control instructions as said predetermined processes in accordance with given second reception cues or queues; and cuing or queuing control means, coupled to said first transmitter means and said second receiver means, for generating said given first transmission cues or queues and said given second reception cues or queues, such that the predetermined processes selected by said first transmitter means logically correspond to the predetermined processes selected by said second receiver means, respectively.

3. An information transmission control apparatus according to claim 1, wherein said elevator car unit control means is provided with a plurality of said predetermined processes, and said elevator car unit control means includes:

second transmitter means for selecting one-by-one said predetermined processes in accordance with given second transmission cues or queues, and serially outputting the selected predetermined processes as said control instructions to said data transmission means; and cuing or queuing control means, coupled to said second transmitter means and said first receiver means, for generating said given second transmission cues or queues and said given first reception cues or queues, such that the predetermined processes selected by said second transmitter means logically correspond to the predetermined processes selected by said first receiver means, respectively.

4. An information transmission control apparatus according to claim 1, wherein said elevator system further comprises:

monitor means, physically coupled to said group control means and said elevator car unit control means via said data transmission means, for monitoring total operation of the elevator system.

5. An information transmission control apparatus according to claim 4, wherein said monitor means is provided with a plurality of said predetermined processes, and said monitor means includes:

monitor receiver means for receiving said control instructions serially transmitted via said data transmission means, and selecting one-by-one the received control instructions as said predetermined processes in accordance with given monitor reception cues or queues; and cuing or queuing control means, coupled to said first transmitter means and said second monitor receiver means, for generating said given first transmission cues or queues and said given monitor reception cues or queues, such that the predetermined processes selected by said first transmitter means logically correspond to the predetermined processes selected by said second receiver means, respectively.

6. An information transmission control apparatus according to claim 4, wherein said monitor means is provided with a plurality of said predetermined processes, and said monitor means includes:

monitor transmitter means for selecting one-by-one said predetermined processes in accordance with given monitor transmission cues or queues, and serially outputting the selected predetermined processes as said control instructions to said data transmission means; and cuing or queuing control means, coupled to said monitor transmitter means and said first receiver means, for generating said given monitor transmission cues or queues and said given first reception cues or queues, such that the predetermined processes selected by said monitor transmitter means logically correspond to the predetermined processes selected by said first receiver means, respectively.

7. An information transmission control apparatus according to claim 1, wherein each said control instruction includes a data packet containing sender address information and receiver address information, and the data packet is serially sent via said data transmission means.

8. An information transmission control apparatus according to claim 2, wherein each said control instruction includes a data packet containing sender address information and receiver address information, and the data packet is serially sent via said data transmission means.

9. An information transmission control apparatus according to claim 3, wherein each said control instruction includes a data packet containing sender address information and receiver address information, and the data packet is serially sent via said data transmission means.

10. An information transmission control apparatus according to claim 4, wherein each said control instruction includes a data packet containing sender address information and receiver address information, and the data packet is serially sent via said data transmission means.

11. An information transmission control apparatus for an elevator system including a group control function section for providing a control instruction for managing the operation of elevators in accordance with demands or conditions based on various kinds of information; a plurality of unit control function sections, provided for respective elevator cars, for controlling the elevator system based on the instruction from the group control function section; and a monitor control function section, capable of exchanging information with the control function sections, for monitoring the entire elevator system, wherein the respective control function sections are connected through a network, and a plurality of logical communication paths are set in the network so that a logical connection relationship is established among said control function sections.

12. An information transmission control apparatus for an elevator system including a group control function section for providing a control instruction for managing the operation of elevators in accordance with demands or conditions based on various kinds of information such as status information of a plurality of elevators and generated hall call information; a unit control function section, corresponding to each elevator unit, for controlling the elevator based on the instruction from said group control function section; and a monitor control function section, capable of exchanging information with said control function sections, for monitoring the entire elevator system, comprising:

first means for connecting said control function sections through a network, and setting a plurality of logical communication paths in said network;

second means for establishing logical connection relationships using said logical communication paths for each of inter-process control units, and executing inter-process communications using a packet in order to execute communications between controllers in said control function sections; and third means for sending the communication packet to the logically connected control process to realize control functions of said elevator system.

13. An information transmission control apparatus for an elevator system including a group control function section for providing a control instruction for managing the operation of elevators in accordance with demands or conditions based on various kinds of information; a plurality of unit control function sections, provided for respective elevator cars, for controlling the elevator system based on the instruction from the group control function section; and a monitor control function section, capable of exchanging information with the control function sections, for monitoring the entire elevator system, comprising:

first means for connecting said control function sections through a network, and setting a plurality of logical communication paths in said network;

second means for establishing logical connection relationships using said logical communication paths for each of inter-process control units, and executing inter-process communications in order to execute communications between controllers in said control function sections; and third means for sending the communication packet to the logically connected control process to realize control functions of said elevator system.

* * * * *